July 12, 1927.
S. LIPPERT
1,635,372
SIGNAL LIGHT FOR VEHICLES
Filed March 31, 1924
3 Sheets-Sheet 1
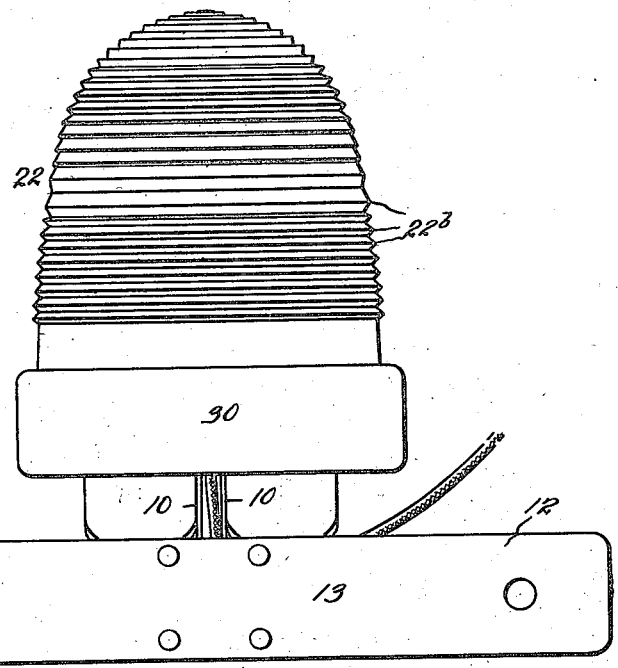
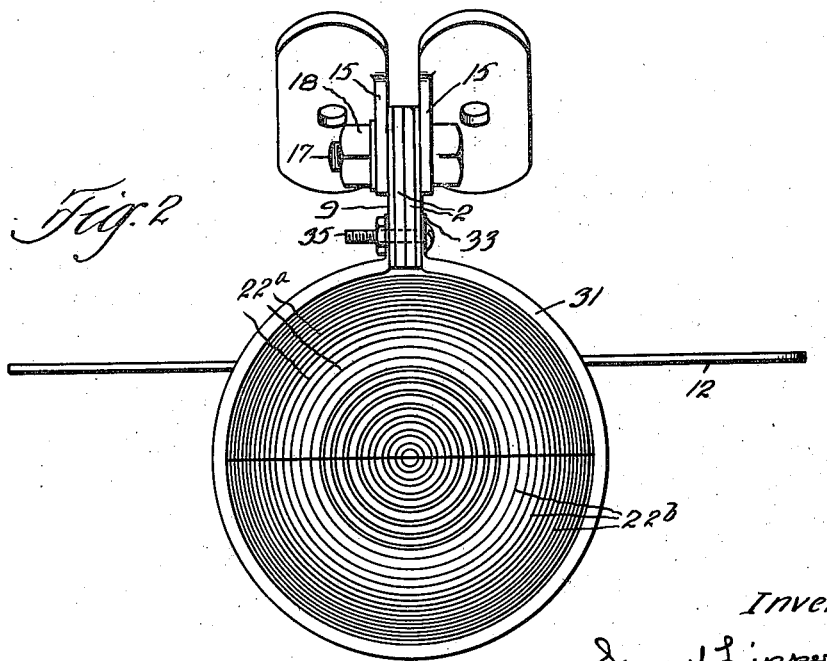

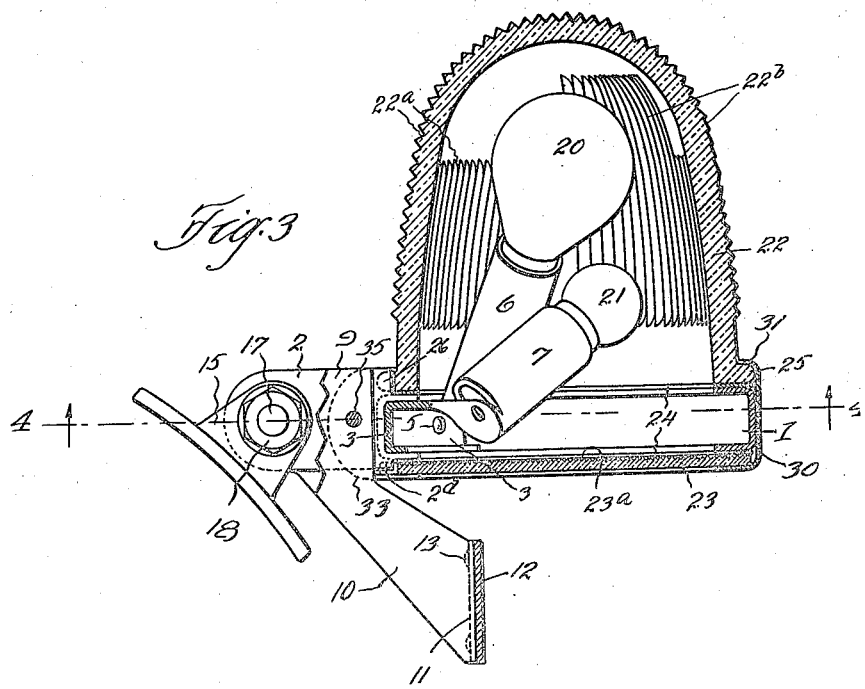
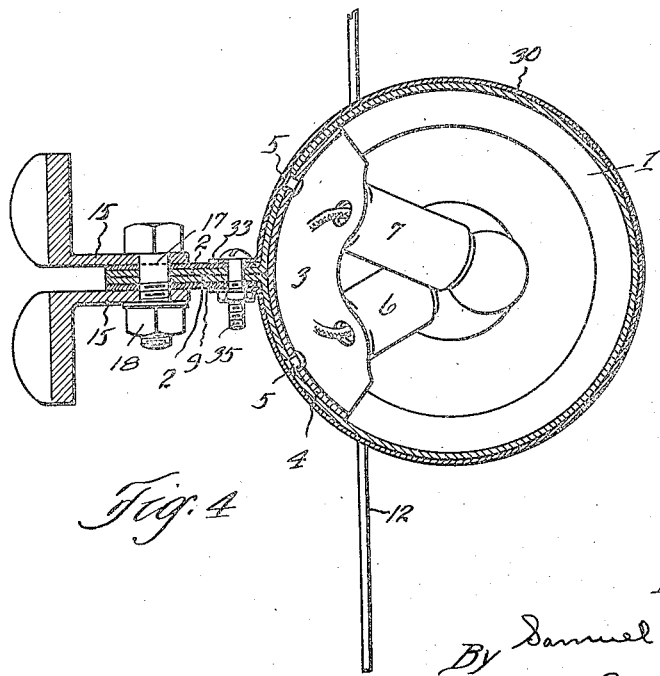

July 12, 1927.
S. LIPPERT
1,635,372
SIGNAL LIGHT FOR VEHICLES
Filed March 31, 1924
3 Sheets-Sheet 3
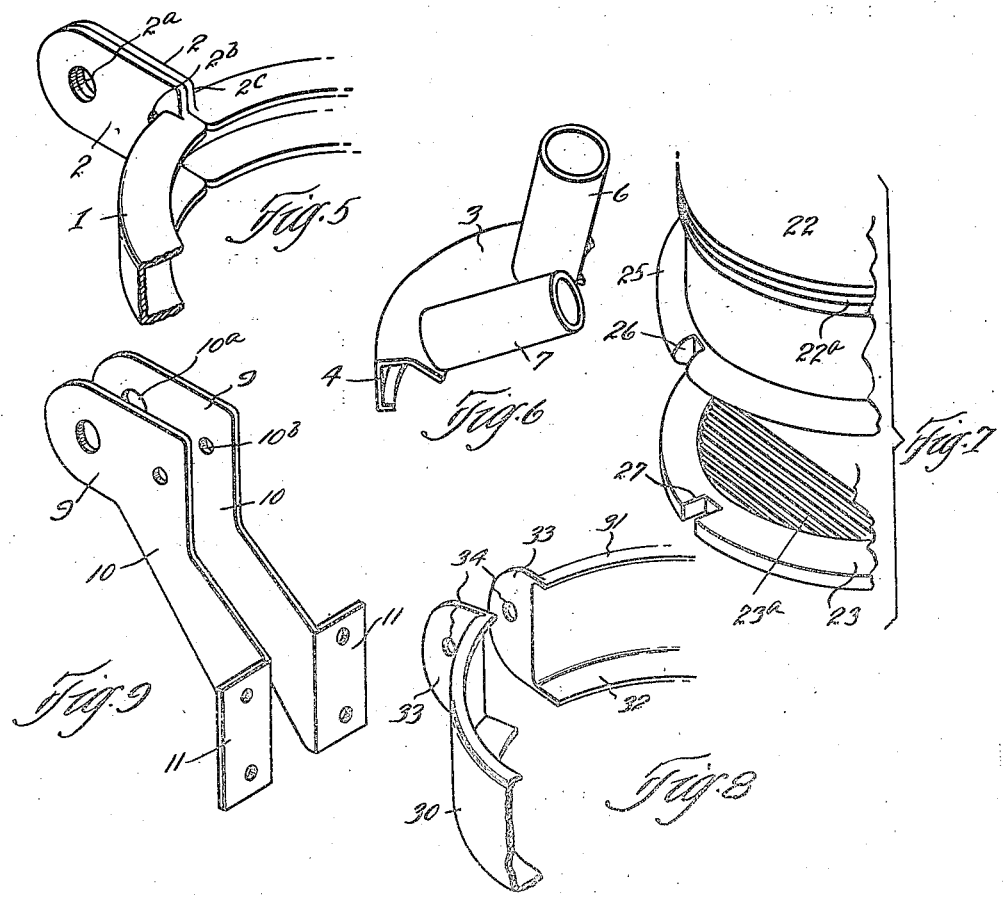
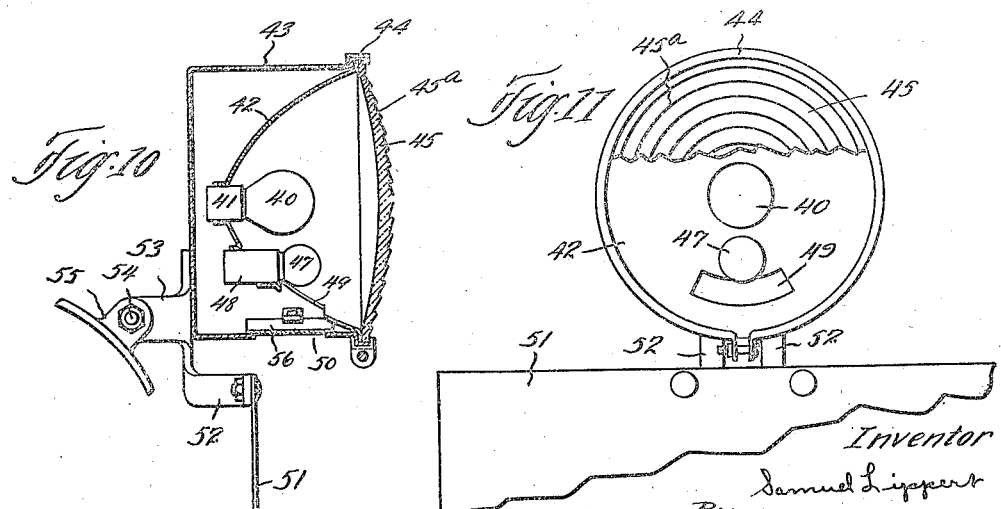

Patented July 12, 1927.

1,635,372

UNITED STATES PATENT OFFICE.

SAMUEL LIPPERT, OF GARFIELD HEIGHTS, OHIO, ASSIGNOR TO THE OUTLOOK COMPANY, OF CLEVELAND, OHIO, A CORPORATION OF OHIO.

SIGNAL LIGHT FOR VEHICLES.

Application filed March 31, 1924. Serial No. 703,190.

This invention relates to signal lights for vehicles and more particularly to improvements in that class which combines in one device a "stop" or signal light and a tail light.

The present preferred embodiment, as it pertains to the "stop" or signal light, follows in a general way the principle involved in the warning signal for vehicles disclosed in the application of Arnold L. Stern and Frederick F. Hesse, Serial No. 662,172, filed September 12, 1923; and in this more desirable form I utilize a globe incorporating refracting and reflecting prisms, a product of the Holophane Glass Company, New York, and to which globe, per se, I make no claim.

What I regard as the fundamental principle of my invention is the combination of a reflector having a focal point; a signal light substantially coincident with said point; and a tail light associated with the reflector but out of focus with respect thereto, the two lights having, preferably in common, a transparent screen or lens through which their beams are projected.

The primary object of my invention is to provide means for carrying out the foregoing principle in a highly practical and efficient manner.

Other objects are to provide a comparatively simple and inexpensive construction that is very durable; that is made up largely of die stamped sheet metal parts; that is adapted for convenient attachment to a vehicle; that is adjustable with respect to the vehicle; wherein a license tag support is fixedly held in a definite relation to the tail light and which relation cannot be disturbed through the adjustment of the device with respect to the vehicle thereby assuring a proper illumination of the license tag by the tail light; wherein certain parts are readily removable for the purposes of replacement, and of ready accessibility of the lights; while other objects will become apparent as this description proceeds, reference being had to the accompanying drawings.

Fig. 1 shows my improved combined stop and tail light in rear elevation—that is, as it would appear when attached to a vehicle and viewed from the rear thereof; Fig. 2 is a plan view of the device; Fig. 3 is a central vertical section through the device from front to rear; Fig. 4 is a bottom sectional plan, the plane of section being indicated by the line 4—4 of Fig. 3; Fig. 5 is a fragmentary perspective view of the base; Fig. 6 is a perspective view of the lamp sockets; Fig. 7 shows in perspective fragments of the globe and lens; Fig. 8 is a fragmentary perspective view corresponding to Fig. 5 of the globe and lens retaining ring; Fig. 9 is a perspective view of the bracket plates which support the license tag; while Figs. 10 and 11 are, respectively, a sectional side elevation and a rear elevation of a modified form of the invention.

In the preferred embodiment, illustrated in Figs. 1 to 9, I employ a base 1 in the nature of an annulus which is preferably constructed of a piece of sheet metal and given a channel formation throughout the greater portion of its length while its ends are left flat and are turned outwardly on lines substantially radial with respect to the annulus to form ears 2 that are provided with holes 2$^a$ and 2$^b$, as will appear by reference to Fig. 5. The ears 2 extend over the top and bottom flanges of the base 1 to provide positioning lugs 2$^c$ and 2$^d$ for a purpose which I shall presently explain. The ends of the base 1 are secured together through a fitting 3, shown in perspective in Fig. 6, and which comprises a channel portion 4 that fits within the channel of the base 1 and is secured adjacent its ends to the web of said base, as by rivets 5. The fitting 4 is suitably formed from sheet metal and carries lamp sockets 6 and 7, said sockets comprising shells which are preferably made integral with the portion 4.

Engaged on opposite sides of the ears 2 are similarly shaped portions 9 of bracket plates 10, said plates extending downwardly and rearwardly from the ears 2 and terminating in flanges 11 to which a bar 12 is secured, as by rivets 13, the bar constituting a support for the usual license tag (not shown). The plates 10 have apertures 10$^a$ and 10$^b$ which register, respectively, with the apertures 2$^a$ and 2$^b$ of the ears 2.

The structure is adapted to be supported from a suitable part of a vehicle, as from a rear fender, by means of lugs 15 that are arranged for application to the opposite sides of the portions 9 of plates 10, and said lugs have apertures registering with those designated 10$^a$ and 2$^a$ of the portions 9 and ears 2, respectively. A bolt 17, to which a nut 18 is applied, is engaged through the aligning apertures and serves to clamp the various parts together and maintain the proper angular relation between the lugs and the supported parts.

The respective sockets 6 and 7 are fitted with lamps 20 and 21, the former constituting the "stop" or signal light and the latter the tail light. Surmounting the base 1 and enclosing the lamps 20 and 21 is a globe 22; and engaged across the underside of the base is a lens 23. Gaskets 24 of suitable material are preferably interposed between the top of the base and the globe and between the bottom of the base and the lens. The globe is provided with a peripheral flange 25 which, as will be seen by reference to Figs. 3 and 7, is notched at 26 for cooperation with the positioning lug 2$^c$ formed by the rear upper corners of the ears 2, while the edge of the lens 23 is notched at 27 for like cooperation with the lug 2$^d$ constituted of the rear lower corners of said ears. The globe and lens are thus properly positioned with respect to the base, and the importance of so positioning these parts will be appreciated when it is explained that the globe 22 is formed on its front side with reflecting prisms 22$^a$, and on its rear side with refracting prisms 22$^b$, while the lens 23 is provided with refracting prisms 23$^a$. With the globe arranged correctly with respect to the base, and the lamp 20 sustained at what may be termed the focal point of the globe, rays of light from the lamp 20 are reflected rearwardly by the prisms 22$^a$ and, with the direct rearward rays from the lamps, are properly directed by the refracting prisms 22$^b$ to produce an exceedingly brilliant beam at the proper elevation and angle with respect to the vehicle, serving to the utmost of the capacity of the lamp 20 as an efficient signal light. The refracting prisms 23$^a$ of the lens 23 serve to deflect the rays from the lamp 21 against a license tag supported by the bar 12. The lens 23 is preferably of clear glass while the globe 22 is desirably constructed of red, or so-called "ruby," glass. It will be noted that the license tag supporting bar 12 has a rigid connection with the lamp supporting parts and consequently the relation between the license tag and tail light cannot be disturbed through any adjustments of the device with respect to the vehicle.

The globe and the lens are secured to the base by means of a split ring 30 which has top and bottom flanges 31 and 32. These flanges engage, respectively, the flange 25 of the globe and the peripheral portion of the lens 23. The split ring terminates at its ends in ears 33 which have holes 34 registering with the apertures 2$^b$ of the ears 2 so that a bolt 35 may be engaged therethrough to bind the parts together. The bolt is made sufficiently long, and the bottom flange 32 of the ring 30 sufficiently wide, to permit the ring 30 to be released and expanded enough to remove the globe 22 without completely freeing the ends of the ring and without dislodging the lens 23 from the flange 32.

As hereinbefore related, the formation of the globe 22 with the reflecting and refracting prisms constitutes no part of my invention except as to the location of the stop or signal light or lamp substantially coincident with the focal point of the globe, and the positioning of the tail light or lamp 21 considerably remote from the focal point so that its rays will not be affected by the prisms of the globe nor illuminate the globe to any material extent except in the immediate region of the lamp 21. The lamp, however, is in a position to adequately light the license tag, especially as its rays are directed and distributed by the prisms 23$^a$ of the lens 23.

The same principle is present in the embodiment of the invention illustrated in Figs. 10 and 11 wherein a lamp 40 is supported by a socket 41 at substantially the focal point of a parabolic reflector 42 which is housed within and secured to the open side of a casing 43 by means of a clamping ring 44, the edge portion of the reflector and the periphery of a lens 45 being confined between an internal shoulder of the casing and the opposed flange of the said ring 44. Also supported within the reflector 42, but considerably out of focus with respect thereto, is a tail lamp 47 that is sustained by a socket 48 in a position to project light through openings 49 and 50 in the reflector and casing, respectively, onto a license tag 51 supported below the casing through a branch 52 of a suitable bracket 53 by means of which the casing is adjustably connected, through a bolt 54, to lugs 55 that are used for attaching the structure to a vehicle. A protecting glass 56 is shown as closing the opening 50 in the casing 43. The lens 45 is provided with suitable refracting prisms 45$^a$ which serve to properly direct the beams from the reflector 42 and lamp 40 so as to procure therefrom the maximum of efficiency as a stop or signal light. The lamp 47 serves merely to moderately illuminate the portion lens 45, and more especially the portion thereof that is adjacent said lamp, and to properly light the lincense tag 51.

In both forms of the invention it is intended that after dark the tail light shall be on constantly, and that the stop or signal lamp shall be illuminated only when the driver intends to slow down, stop or change his direction of travel, the circuit of said lamp being preferably controlled by a switch having operative connection with the brake pedal or other element of the vehicle so that the operation of the stop or signal lamp shall be automatic. When the stop or signal lamp is off, and the tail lamp on, the instrument serves adequately as a tail light; but just as soon as the stop or signal lamp is illuminated, the gleam from the instrument becomes so intense, and the area of the globe or lens so thoroughly illuminated, that the effect of the tail light is practically obliviated.

Having thus described my invention, what I claim is:—

1. In a device of the character set forth, the combination of an annular base constructed of sheet metal and having an inwardly opening channel formation except at its ends where it terminates in ears, a fitting disposed within the portion of the base adjacent its ends and through which the ends are connected together with said ears engaging each other, said fitting incorporating lamp sockets that project above the base, lamps supported by said sockets, a globe surmounting the base and enclosing said lamps, a split ring encircling the base and having a part cooperating with the globe for securing it to the base, and means for connecting the ends of said ring to the aforesaid ears of the base.

2. In a device of the character set forth, the combination of an annular base constructed of sheet metal and having an inwardly opening channel formation except at its ends where it terminates in ears, a fitting disposed within the portion of the base adjacent its ends and through which the ends are connected together with said ears engaging each other, said fitting incorporating lamp sockets that project above the base, lamps supported by said sockets, a globe surmounting the base and enclosing said lamps, a lens disposed across the underside of the base, a split ring encircling the base and having parts cooperating with the globe and lens for securing them to the base, and means for connecting the ends of said ring to the aforesaid ears of the base.

3. In a device of the character set forth, the combination of an annular base constructed of sheet metal and having an inwardly opening channel formation except at its ends where it terminates in ears, a fitting disposed within the portion of the base adjacent its ends and through which the ends are connected together with said ears engaging each other, said fitting incorporating lamp sockets that project above the base, lamps supported by said sockets, a globe surmounting the base and enclosing said lamps, a lens disposed across the underside of the base, a split ring encircling the base and having parts cooperating with the globe and lens for securing them to the base, and means for connecting the ends of said ring to the aforesaid ears of the base, portions of said ears constituting positioning lugs, the globe and lens having recesses for the reception of said lugs whereby they are properly positioned with respect to the base.

4. In a device of the character set forth, the combination of a base comprising a split ring of inwardly opening channel formation terminating at its ends in ears that are substantially radial with respect to the ring, a fitting including a part set within the channel of the base and overlapping and connected to the ends thereof thereby to secure said ends together with the aforesaid ears adjacent each other, said fitting incorporating lamp sockets, lamps supported by said sockets, a globe surmounting the base and enclosing said lamps, said globe having a peripheral flange adjacent the base, a lens disposed across the underside of the base, a split ring surrounding the base and having top and bottom flanges which overlap the flange of the globe and the edge portion of the lens, respectively, and means securing the ends of said ring to the aforesaid ears.

5. In a device of the character set forth, the combination of a base comprising a split ring terminating at its ends in ears that are substantially radial with respect to the ring, a fitting supported by the base and incorporating a lamp socket, a lamp supported by said socket, a globe surmounting the base and enclosing said lamp, said globe having a peripheral flange adjacent the base, a lens disposed across the underside of the base, a split ring surrounding the base and having top and bottom flanges which overlap the flange of the globe and the edge portion of the lens, respectively, and means securing the ends of said ring to the aforesaid ears.

6. In a device of the character set forth, the combination of a base comprising a split ring that terminates at its ends in ears that are substantially radial with respect to the ring, a fitting sustained by the ring and incorporating lamp sockets, lamps supported by said sockets, a globe surmounting the base and enclosing said lamps, a lens disposed across the underside of the base, means for securing the globe and lens to the base, and brackets having parts engaged on opposite sides of the aforesaid ears and designed to support a license tag below the base where it will receive light through the aforesaid lens, supporting lugs applied to opposite sides of the aforesaid parts of the brackets, and means extending through aligning apertures in said lugs, brackets and ears for securing the parts together.

7. In a device of the character set forth, the combination of an annular base having a lateral extension, a fitting arranged within said base, lamp sockets carried by said fitting, lamps sustained by said sockets, a globe surmounting the base and enclosing the lamps and having a flange adjacent the base, a lens disposed across the underside of the base, and a split ring surrounding the base and having a comparatively shallow flange which engages over the flange of the globe and a relatively deep flange underlying the edge portion of the lens, and means for adjustably connecting the ends of said ring to the aforesaid lateral extension of the base.

8. In a device of the character set forth, the combination of an annular base, a lamp sustained thereby, a globe surmounting the base and enclosing the lamp and having a flange adjacent the base, a lens disposed across the underside of the base, and a split ring surrounding the base and having a comparatively shallow flange which engages over the flange of the globe and a relatively deep flange underlying the edge portion of the lens, and means for adjustably connecting the ends of said ring.

9. In a device of the class described, an annular base member of channel formation throughout the greater portion of its length and having its ends left flat and turned outwardly substantially radial with respect to said base member, a fitting comprising a channel portion adapted to fit within the channel portion of said base member and secured thereto adjacent its ends whereby to secure the ends of said base member together, said fitting incorporating lamp sockets which project above the base member, lamps supported by said sockets in unobstructed communication with each other and a globe secured to said base member and held in fixed relation with respect to said lamps.

10. In a device of the class described, a base comprising an annular member of channel formation, a fitting secured within said channel formation and supporting a signal lamp and a tail lamp, a globe substantially enclosing said lamps and having a focal point within the globe, said signal lamp being positioned at the focal point of said globe and said tail lamp being remote from said focal point, cooperating parts on said globe and base for positioning said globe with respect to said signal lamp and refracting prisms in said globe in operative relation to said signal lamp, both of said lamps being positioned so as to illuminate the interior of said globe.

11. In a device of the character set forth, a base comprising an annular member of channel formation, a fitting secured within said base and supporting a pair of lamp sockets, lamps carried by said sockets and a globe substantially enclosing said lamps and secured to said base and cooperating parts on said globe and base for positioning said globe with respect to said lamps, said globe having refracting prisms in operative relation to one of said lamps, both of said lamps being positioned so as to illuminate the interior of said globe.

In testimony whereof, I hereunto affix my signature.

SAMUEL LIPPERT.